United States Patent
Matsushita et al.

(10) Patent No.: US 8,939,452 B2
(45) Date of Patent: Jan. 27, 2015

(54) METAL GASKETS FOR CYLINDER HEADS, AND METHODS FOR MANUFACTURING SAME

(75) Inventors: Yoshitaka Matsushita, Saitama (JP); Yuji Takahashi, Saitama (JP); Yoshimi Arakawa, Saitama (JP)

(73) Assignee: Nippon Leakless Industry Co., Ltd., Tokyo (JP)

( * ) Notice: Subject to any disclaimer, the term of this patent is extended or adjusted under 35 U.S.C. 154(b) by 0 days.

(21) Appl. No.: 13/580,349

(22) PCT Filed: Feb. 21, 2011

(86) PCT No.: PCT/JP2011/000962
§ 371 (c)(1),
(2), (4) Date: Aug. 21, 2012

(87) PCT Pub. No.: WO2011/102148
PCT Pub. Date: Aug. 25, 2011

(65) Prior Publication Data
US 2012/0319361 A1  Dec. 20, 2012

(51) Int. Cl.
*F02F 11/00* (2006.01)
*B21D 39/03* (2006.01)
(Continued)

(52) U.S. Cl.
CPC ...... *F16J 15/0825* (2013.01); *F16J 2015/0862* (2013.01); *F16J 15/0831* (2013.01);
(Continued)

(58) Field of Classification Search
USPC ................................. 277/590–598
See application file for complete search history.

(56) References Cited

U.S. PATENT DOCUMENTS 5,743,537 A     4/1998  Yamada
2007/0290452 A1*  12/2007  Matsushita et al. ........... 277/595

FOREIGN PATENT DOCUMENTS

CN  101048588 A  10/2007
EP  1 710 027 A2  10/2006
(Continued)

OTHER PUBLICATIONS

International Search Report of the International Searching Authority, mailed Apr. 19, 2011, for corresponding International Application No. PCT/JP2011/000962, 2 pages.
(Continued)

*Primary Examiner* — Gilbert Lee
(74) *Attorney, Agent, or Firm* — Klarquist Sparkman, LLP

(57) ABSTRACT

Provided is a metal gasket for a cylinder head that is capable of improving engaging force between a substrate and a step adjustment plate. A method for manufacturing the metal gasket for a cylinder head includes the steps of: forming a prepared hole 3c in each of a plurality of protruding pieces 3b of the step adjustment plate 3; forming a tubular portion 3d including a plurality of projecting segments 3d₁ by inserting a die 4 including a polygonal pyramidal punch 4a into the prepared hole 3c so as to bend up a peripheral portion around the prepared hole 3c while cutting the peripheral portion into segments; forming in the substrate 2 an fastening hole 2h in correspondence with a position of the tubular portion 3d formed in the step adjustment plate 3; and engaging the protruding piece 3b through the substrate 2 by inserting the tubular portion 3d of the step adjustment plate 3 through the corresponding fastening hole 2h formed in the substrate 2, and subsequently folding the plurality of projecting segments 3d₁ of the tubular portion 3d over to an outside of the substrate 2 and flattening out the projecting segments 3d₁.

13 Claims, 20 Drawing Sheets

(51) Int. Cl.
*B21D 53/84* (2006.01)
*F16J 15/08* (2006.01)

(52) U.S. Cl.
CPC ....... *B21D39/032* (2013.01); *F16J 2015/0868* (2013.01); *F16J 2015/085* (2013.01); *B21D 53/84* (2013.01)
USPC .......................................... 277/591; 277/590

(56) References Cited

FOREIGN PATENT DOCUMENTS

| | | |
|---|---|---|
| JP | 48-009962 U | 2/1973 |
| JP | 08-010871 | 1/1996 |
| JP | 8-042696 A | 2/1996 |
| JP | 09-177978 | 7/1997 |
| JP | 10281289 A | 10/1998 |
| JP | 2002-286141 A | 10/2002 |
| JP | 2006-289399 | 10/2006 |
| JP | 2007-064449 A | 3/2007 |
| JP | 2010-203379 A | 9/2010 |

OTHER PUBLICATIONS

Supplementary European Search Report, mailed Jul. 25, 2013, for corresponding International Application No. PCT/JP2011/000962, 5 pages.

Office Action for related Japanese Patent Application No. 2010-036530, 5 pages, dated Sep. 10, 2013.

Office Action for related Chinese Patent Application No. 201180010385.4, 14 pages, dated Feb. 8, 2014.

Office Action for related Chinese Patent Application No. 201180010385.4, 6 pages, dated Aug. 13, 2014.

* cited by examiner

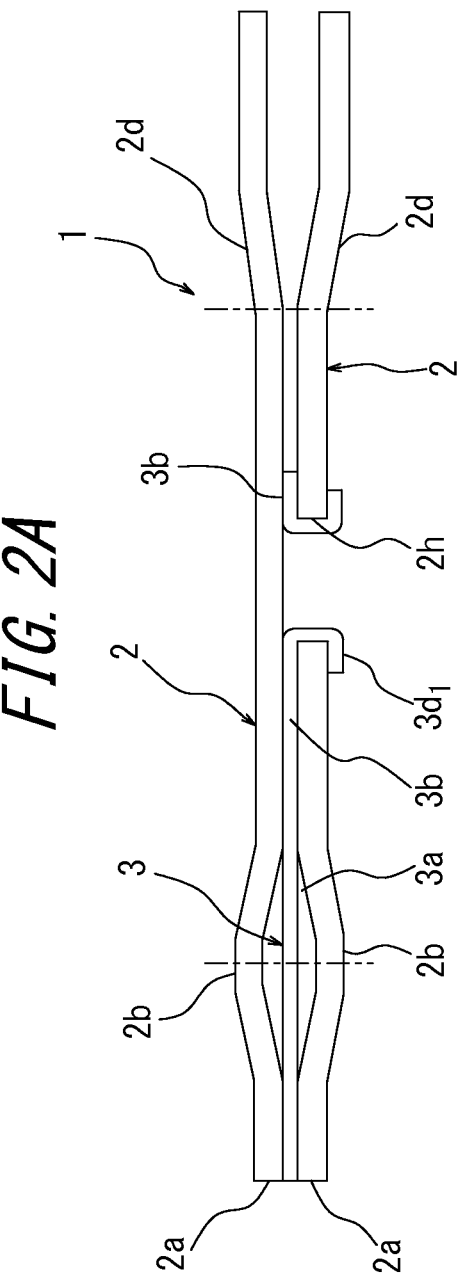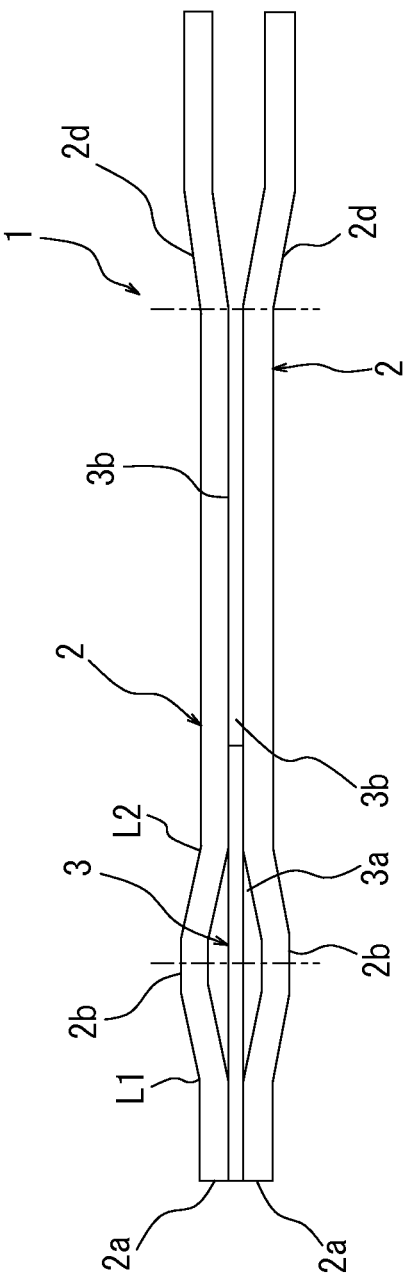

Shapes of pentagonal pyramidal punch

| Reference sign | a | b | c | d | e |
|---|---|---|---|---|---|
| Cone angle $\theta$ (degrees) | 60 | 40 | 30 | 20 | 10 |

Misalignment between blade of punch and pentagonal bottom hole causes defect of shape in tubular portion Cone angles (blade angles) of punch
and manufacturing verification results

| Cone angle θ (degrees) | 10 | 20 | 30 | 40 | 60 |
|---|---|---|---|---|---|
| Manufacturing result | ○ | ○ | ○ | ○ | × |

○ Favorable manufacturing
× Defective manufacturing

Cone angle and cone length of pentagonal pyramidal punch

Prior Art

Prior Art

Portion can be lost
3d
Cracks
Cracking can occur anywhere 3c
3b
3

Portion can be lost
3d₁
3d₁
Cracking can occur
3d₁
3d₁

METAL GASKETS FOR CYLINDER HEADS, AND METHODS FOR MANUFACTURING SAME

This application is the U.S. National Stage of International Application No. PCT/JP2011/000962, filed Feb. 21, 2011, which claims priority to and the benefit of International Patent Application No. JP 2010-036530, filed on Feb. 22, 2010, both of which being incorporated herein by reference in their respective entireties.

TECHNICAL FIELD

The present invention relates to methods for manufacturing a metal gasket for a cylinder head, wherein the gasket is interposed between a cylinder block and a cylinder head of an internal combustion engine to seal a joint surface between the cylinder block and the cylinder head. The invention also pertains to metal gaskets for a cylinder head.

BACKGROUND ART

In internal combustion engines, a metal gasket is interposed between respective joint surfaces between a cylinder block and a cylinder head. The metal gasket is fastened in place by head bolts and serves to seal fuel gas, coolant, and lubricating oil in their proper locations in the engine. In particular, sealing of cylinder holes is crucial, because insufficient sealing of the cylinder holes can cause unwanted leakage flows of fuel gas between adjacent cylinders, which can reduce engine power. Leaking fuel gas can also flow into coolant holes circumferentially formed around the cylinder holes, resulting in malfunctions such as engine overheating, or in the worst case, engine seizure.

In respective efforts to prevent the above phenomena, Patent Literatures 1, 2 disclose respective metal gaskets including a resilient metal layer in which annular beads are provided around the cylinder holes, for example. The metal gaskets disclosed in Patent Literatures 1 and 2 include: a metal substrate made of a metal layer and having cylinder holes formed in correspondence with cylinder bores in a cylinder block of an internal combustion engine. Annular beads are formed around the peripheries of the cylinder holes. Coolant holes are formed along peripheries of the annular beads in correspondence with the cooling water jacket of the cylinder block and coolant holes of the cylinder head. An annular step adjustment plate is provided to face the annular beads of the substrate. The step adjustment plate is provided with claw-shaped portions that are inserted into fastening holes formed in the substrate and folded over to one side so that the step adjustment plate is integrated with the substrate. Due to a thickness difference created by the step adjustment plate provided between the annular beads and outer beads, surface pressure as applied to the gasket is appropriately adjusted.

However, one problem with the technologies disclosed in Patent Literatures 1 and 2 is that, as shown in FIG. 18, the claw-shaped portions 3h are each folded over only to one side. Consequently, the step adjustment plate 3 cannot be strongly fastened to the substrate 2. Another problem is that, as shown in FIG. 19, whenever a plurality of step adjustment plates 3 are stacked on top of one another as inventory products or as components required in a process for manufacturing the metal gaskets, wherein the claw-shaped portions 3h should be perpendicularly bent upward from the step adjustment plate 3, some of the claw-shaped portions 3h actually become obliquely bent. These obliquely bent claw-shaped portions 3h can result in increased manufacturing man-hours being required to reshape the step adjustment plates 3 for assembly to the substrate 2. Sometimes, these step adjustment plates 3 are scrapped as being defective when in fact they are not.

In view of the above problems, the present inventors conducted studies revealing that, as shown in FIGS. 20A and 20B, a strong coupling of the step adjustment plate 3 with the substrate is achieved by providing respective prepared holes 3c in protruding pieces 3b projecting from peripheral edges of the step adjustment plate 3. Material drawing is applied to the periphery of the prepared holes 3c using a die including a cylindrical punch so as to form respective tubular portions 3d each having a circular cross section. The tubular portions 3d are inserted through respective fastening holes 2h in the substrate, and the tubular portions 3d are folded over onto the outside surface of the substrate and flattened. As shown in FIG. 21, it has been found that the above structure eliminates the aforementioned need to make alterations to the step adjustment plates at the time of their assembly to the substrate 2. The above structure also solves the problem in which the step adjustment plates 3 are scrapped as being defective (when in fact they are not) because the formed tubular portions 3d have become obliquely bent when multiple step adjustment plates 3 have been stacked on top of one another as manufacturing inventory or otherwise as components required for manufacturing the metal gaskets.

CITATION LIST

Patent Literature

Patent Literature 1: Japanese Patent Application Publication No. 2002-286141
Patent Literature 2: Japanese Patent Application Publication No. H10-281289

SUMMARY OF INVENTION

Technical Problems

It has also been discovered that, whenever a material for deep drawing (e.g., SUS304 or SUS430 stainless steel) is used to make the above step adjustment plate 3, due to a low tensile strength and a high elongation of the material, the step adjustment plate 3 is weakened with respect to its resistance to expansion and contraction of the cylinder head and cylinder block during a cold temperature operation of the engine. As a result, the step adjustment plate can be deformed in an exhaust direction, an intake direction, or in other directions, as shown in FIGS. 22A and 22B. The deformation tendency is noticeable especially in an engine that produces high power and has low rigidity, and measures must be taken against such deformation.

One of the ways in which to cope with deformation of the step adjustment plate 3 is to increase its thickness so as to enhance its strength. However, this manner of coping increases strain in the cylinder head and cylinder block, thereby causing other problems such as increased oil consumption and abnormal noise heard from various components of the engine, even though this method improves deformation resistance and sealing performance against fuel gas. From the requirement of compatibility between the seal performance of the gasket and avoiding the above problems due to distortion of the cylinder head and cylinder block, an appropriate thickness of a metal foil constituting the step adjustment plate 3 should generally be limited to a range of 0.05 mm to 0.15 mm. This range restriction is one of the foremost causes of gasket deformation during use. In particular, when an extremely thin metal foil having a thickness of 0.05 mm is utilized for defining a slight step, gasket deformation must be addressed, which increases the demand for measures to prevent deformation of the step adjustment plate 3.

Since the aforementioned anti-deformation methods including increasing the thickness of the metal foil cannot be adopted to prevent deformation of the step adjustment plate 3 in view of the above problems, a resilient material such as stainless steel, as used for making springs (e.g., SUS301-½H, SUS301-¾H, and SUS304-3/4H stainless steels) has been used as the metal foil from which step adjustment plates 3 are made. The thus formed step adjustment plate 3 was fastened to a substrate 2. However, in this case, the following additional problems emerged.

More particularly, in each circular prepared hole 3c provided in the protruding piece 3b of the step adjustment plate 3, a tubular portion 3d having a circular cross section is formed using a die including a cylindrical punch. Then, the tubular portion 3d is inserted through a corresponding fastening hole 2h of the substrate 2. Subsequently, the tubular portion 3d was folded over (bent) onto an outside surface of the substrate 2 and flattened out. In this case, however, as shown in FIG. 23A, cracking can occur anywhere. If the space between cracks is small, the force with which the folded portions engage the substrate 2 is decreased. Furthermore, because of the cracking, the folded portions can detach from the step adjustment plate 3. A detached folded portion poses a risk of causing a sealing deficiency if it should lodge between the step adjustment plate 3 and the substrate 2. If left in the die, a detached portion can cause damage to bead portions of the substrate 2. Moreover, as shown in FIG. 23B, even if a prepared hole 3c having a polygonal shape is provided in the protruding piece 3b of the step adjustment plate 3 in advance, and if a tubular portion 3d having a polygonal cross section is formed by inserting a die including a cylindrical punch, as shown in FIG. 23C, the use of a resilient material as the step adjustment plate 3 inevitably results in occurrence of cracks in the middle portion of the tubular portion 3d or loss of a portion of the tubular portion 3d.

In light of the above, an objective of the present invention is to provide a methods for manufacturing a metal gasket for a cylinder head, wherein the gasket provides firm engagement between the substrate and the step adjustment plate without exhibiting the aforementioned occurrence of cracks and detachment. Another objective of the present invention is to provide metal gaskets for a cylinder head that increase the engaging force between the substrate and the step adjustment plate. The gaskets also provide an appropriate contact pressure balance by defining the thickness difference between the annular beads and the outer beads by means of a slight step utilizing the metal foil.

Means for Solving the Problem

Thus, an objective of the present invention is to advantageously solve the aforementioned problems. To such end, the present invention provides methods for manufacturing a metal gasket for a cylinder head. The metal gasket includes: at least one substrate made of a resilient metal layer and having cylinder holes formed in correspondence with cylinder bores in a cylinder block to be mounted to the cylinder head in an engine. Respective annular beads are formed around the cylinder holes. Coolant holes are formed around an outer periphery of each of the annular beads in correspondence with coolant holes of the cylinder head and with a cooling water jacket or coolant holes of the cylinder block. Respective outer beads are formed and positioned to entirely enclose the annular beads and the coolant holes. A step adjustment plate is made of a metal layer and has a plurality of annular portions each disposed over and around an outer periphery of a different one of the cylinder holes of the substrate. Multiple protruding pieces are formed integrally with each annular portion at a peripheral edge thereof. Each protruding piece of the step adjustment plate is engaged through the substrate. The method also comprises the steps of: forming a prepared hole in each protruding piece of the step adjustment plate; forming a tubular portion including a plurality of projecting segments by inserting a die including a polygonal pyramidal punch into the prepared hole so as to bend up a peripheral portion around the prepared hole while cutting the peripheral portion into segments; forming in the substrate a fastening hole in correspondence with the position of the tubular portion formed in the step adjustment plate; and engaging the protruding piece through the substrate by inserting the tubular portion of the step adjustment plate through the corresponding fastening hole formed in the substrate. Subsequently, the plurality of projecting segments of the tubular portion are folded over onto the outside of the substrate, and the projecting segments are flattened out. Note that "polygonal pyramidal shape" herein encompasses truncated polygonal pyramidal shapes in which the tip of the punch is flattened or rounded.

According to the above method for manufacturing a metal gasket for a cylinder head, a die including a polygonal pyramidal punch is used for bending up the peripheral portions around prepared holes formed in the protruding piece of the step adjustment plate into corresponding tubular shapes. The sidewalls of the bent-up tubular portions are cut into a plurality of projecting segments having a substantially uniform size by angled edges (i.e., edges joining adjacent conical surfaces and serving as blades) of the punch. Accordingly, by folding the plurality of projecting segments over to the outside and flattening them out, a state is achieved in which the flattened projecting segments are uniformly distributed in a petaloid shape. Thus, firm engagement is established between the substrate and the step adjustment plate. As a result, even when fretting (relative surface motions in the engine in directions parallel to deck surfaces of the cylinder head and the cylinder block) occur in the deck surfaces due to repeated heating and cooling of the cylinder head and the cylinder block, disengagement of the step adjustment plate from the substrate is prevented. The present invention is particularly advantageous when a resilient material (e.g., stainless steel strips as used for manufacturing springs) is used as a material for the step adjustment plate.

In the above method for manufacturing a metal gasket for a cylinder head, it is preferable that the polygonal pyramidal punch of the die comprise a pentagonal pyramidal punch, and that the plurality of projecting segments of the tubular portion comprise five projecting segments. With this structure, the plurality of projecting segments of the tubular portion which have been flattened in the petaloid shape are each assured to have a sufficient size to establish the firmly engaged state with respect to the substrate.

Furthermore, in the above method for manufacturing a metal gasket for a cylinder head, the punch of the die preferably has a cone angle θ ranging from 20 to 40 degrees. Note that the "cone angle of the punch" herein refers to an angle of the angled edges, which are located between adjacent conical surfaces of the polygonal pyramidal punch and serve as blades, with respect to an axis of the punch. If the cone angle of the punch is greater than 40 degrees, some parts of the tubular portion cannot be cut into a plurality of segments simultaneously with formation thereof, and discrepancy might occur in number and angle (i.e., the inclination angle of the projecting segments with respect to a plane in which the step adjustment plate extends). On the other hand, if the cone angle of the punch is less than 20 degrees, the press stroke is lengthened, and the tip of the die is thinned. Such a die has an increased risk of break-off of the tip during use, although this case presents no problems in terms of forming the tubular portion.

Moreover, in the above method for manufacturing a metal gasket for a cylinder head, it is preferable that the prepared hole formed in the step adjustment plate be circular. Although it is no problem to form the prepared hole in a polygonal shape in concordance with the shape of the punch, such a polygonal prepared hole in combination with a similarly polygonal punch adversely affects workability in terms of reduced positional precision and angular positional precision of the hole and the punch. If the prepared hole is formed having a circular shape, a need for positional alignment and angular positional alignment is eliminated, which maintains favorable quality and improved workability.

Moreover, in the above method for manufacturing a metal gasket for a cylinder head, it is preferable that the fastening hole formed in the substrate be circular. Although it is no problem to form polygonal fastening holes in concordance with the cross section of the tubular portion, such a polygonal fastening hole, in combination with a similarly polygonal tubular portion to be inserted into the fastening hole, adversely affects workability in teams of reduced positional precision and reduced angular precision of the fastening hole and the tubular portion. Furthermore, whenever the fastening hole of the substrate is formed in the polygonal shape, the die used for folding the projecting segments of the tubular portion over to the outside and flattening the projecting segments out needs to be formed in a polygonal shape, which also adversely affects workability in terms of positional precision and angular precision of the folding die and the projecting segments. On the other hand, whenever a circular fastening hole is formed, the need for the positional alignment and angular alignment is eliminated, both between the fastening hole and the tubular portion and between the folding die and the projecting segments. Consequently, favorable quality is maintained while workability is improved.

The present invention also provides a metal gasket for a cylinder head, the metal gasket including: at least one substrate made of a resilient metal layer and having cylinder holes formed in correspondence with cylinder bores in a cylinder block to be mounted to a cylinder head in an engine, annular beads each formed around a different one of the cylinder holes, coolant holes formed around an outer periphery of each of the annular beads in correspondence with coolant holes of the cylinder head and a cooling water jacket or coolant holes of the cylinder block, and an outer bead formed and positioned to entirely enclose the annular beads and the coolant holes. The gasket also includes a step adjustment plate made of a metal layer and having a plurality of annular portions each disposed over and around an outer periphery of a different one of the cylinder holes of the substrate. The gasket also includes a plurality of protruding pieces formed integrally with each annular portion at a peripheral edge thereof. Each protruding piece of the step adjustment plate is engaged through the substrate, wherein a prepared hole is formed in each protruding piece of the step adjustment plate, and a tubular portion including a plurality of projecting segments is formed by inserting a die including a polygonal pyramidal punch into the prepared hole so as to bend up a peripheral portion around the prepared hole while cutting the peripheral portion into segments. A fastening hole is formed in the substrate in correspondence with a position of the tubular portion formed in the step adjustment plate. The protruding piece is engaged through the substrate by inserting the tubular portion of the step adjustment plate through the corresponding fastening hole formed in the substrate, and subsequently folding the plurality of projecting segments of the tubular portion over onto an outside of the substrate and flattening out the projecting segments.

In the above metal gasket for a cylinder head according to the present invention, the outer edge surface of each annular portion of the step adjustment plate located closer to the coolant holes preferably is situated outward from an outer edge forming a bead profile of the annular beads. It is also preferable that the outer edge surface be located inward from an inner edge of the outer bead formed and positioned to entirely enclose the cooling water jacket or the coolant holes of the cylinder block and the coolant holes.

Effects of the Invention

According to the present invention, a method is provided for manufacturing a metal gasket for a cylinder head that is capable of establishing a firmly engaged state between a substrate and a step adjustment plate. Also provided is a metal gasket for a cylinder head that is capable of improving the engaging force between the substrate and the step adjustment plate.

BRIEF DESCRIPTION OF DRAWINGS

FIG. 2A is a cross-section view of the metal gasket for a cylinder head according to the above embodiment taken along a line A-A of FIG. 1, and FIG. 2B is a cross-section view taken along a line B-B of FIG. 1.

BEST MODES FOR CARRYING OUT THE INVENTION

The following describes an embodiment according to the present invention in detail with reference to the drawings.

Figure 1:
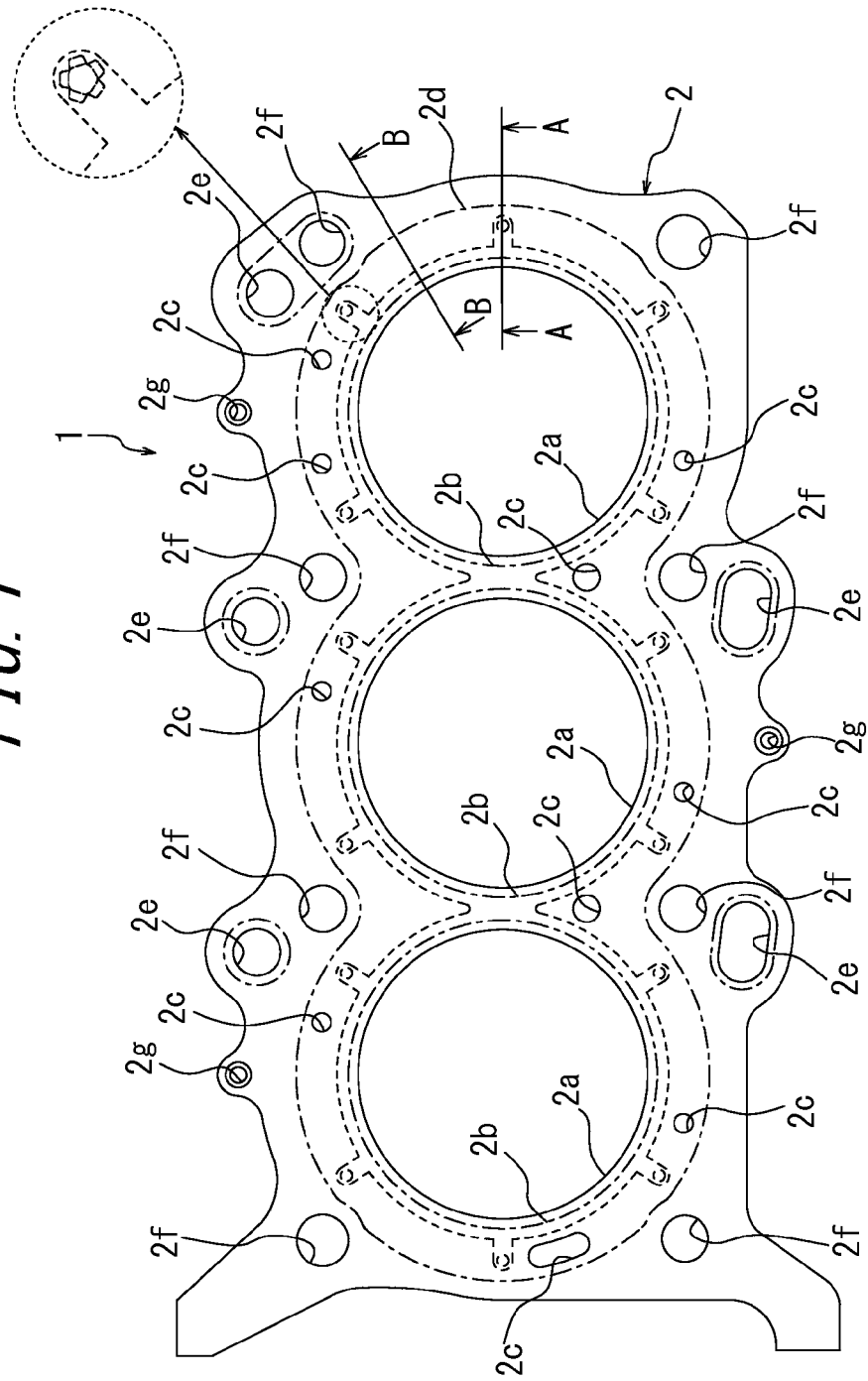
FIG. 1 is a plan view of an entire metal gasket for a cylinder head according to an embodiment in accordance with the present invention.
Figure 3:
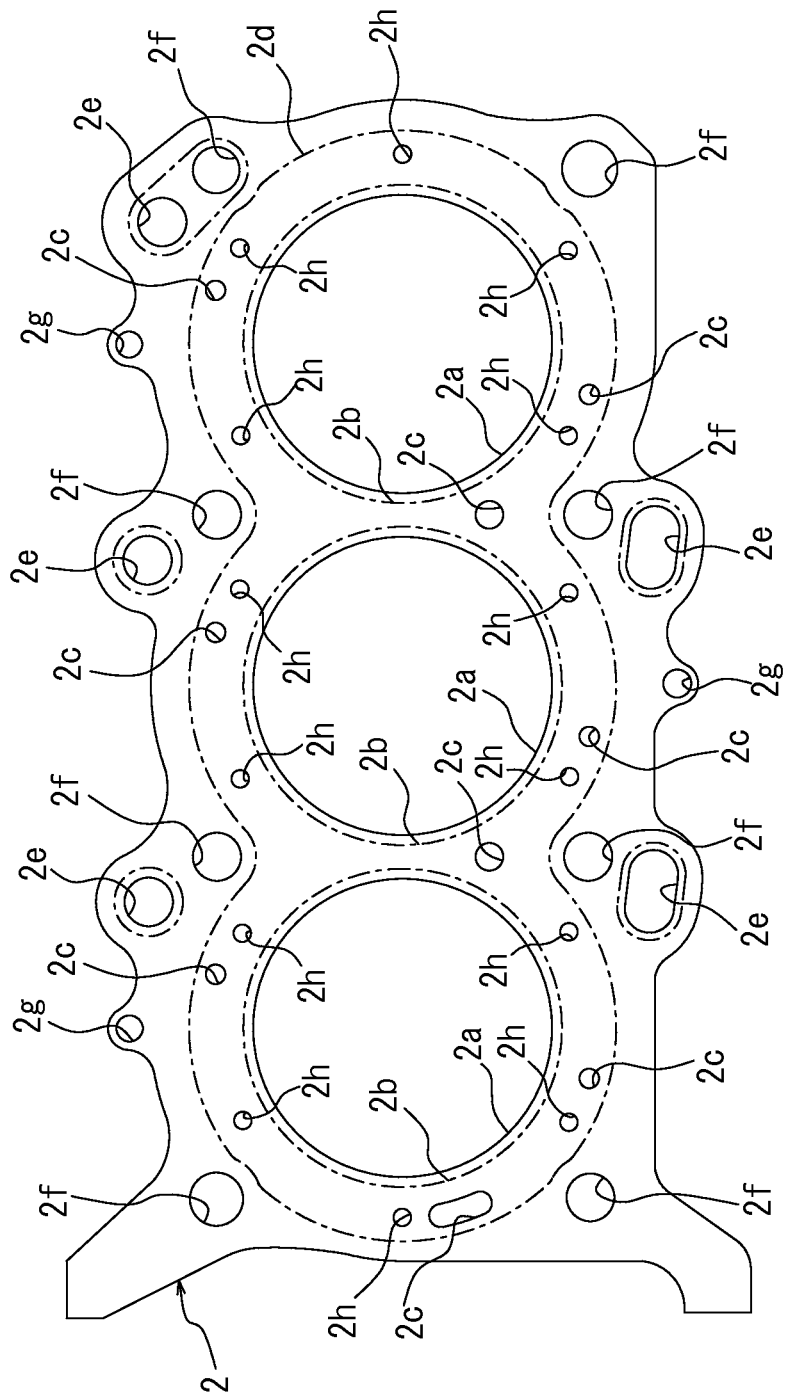
FIG. 3 is a plan view of a lower substrate of the metal gasket for a cylinder head according to the above embodiment.

In the present embodiment, a metal gasket 1 for a cylinder head (referred to below simply as the "metal gasket 1") is a three-layer lamination type that includes three metal layers, including a step adjustment plate and two substrates 2 (as resilient metal layers made of stainless steel), stacked on each other as shown in FIG. 2. As shown in FIGS. 1 and 3, each of the substrates 2 includes: a plurality (three in the drawing) of cylinder holes 2a corresponding to respective cylinder bores in a cylinder block to be mounted to a cylinder head in an engine, i.e., an internal combustion engine to which the metal gasket 1 is to be assembled. Respective annular beads 2b, each having an angular cross-section, are formed around each of the cylinder holes 2a. Multiple coolant holes 2c are formed around the outer periphery of each of the annular beads 2b in correspondence with a cooling water jacket of the cylinder block (in a case of an open deck type cylinder block) or coolant holes of the cylinder block (in a case of a closed deck type cylinder block), as well as coolant holes of the cylinder head. An outer bead 2d having a one-sided sloped cross section is formed and positioned to entirely enclose the annular beads 2b and the coolant holes 2c.

Outside the outer bead 2d, each substrate 2 also includes: a plurality of lubricating oil holes 2e; a plurality (eight in the drawing) of bolt holes 2f in each of which a head bolt is to be inserted for tightly fastening the cylinder head to the cylinder block; and eyelet holes 2g. The annular beads 2b of the two substrates 2 are aligned in a thickness direction of the gasket 1 and externally protruded to face opposite directions. Similarly, the outer beads 2d of the two substrates 2 are aligned in the thickness direction of the gasket 1 and externally protruded to face opposite directions.

Furthermore, as shown in FIG. 3, in this example, the lower substrate 2 facing the deck surface of the cylinder block includes four or five fastening holes 2h circumferentially formed near the outer periphery of each annular bead 2b around a corresponding cylinder hole 2a. The fastening holes are located at an appropriate interval in correspondence with positions of the cooling water jacket of the cylinder block (in the case of an open deck type cylinder block) or the coolant holes of the cylinder block (in the case of the closed deck type cylinder block), as well as the coolant holes of the cylinder head.

Figure 4:
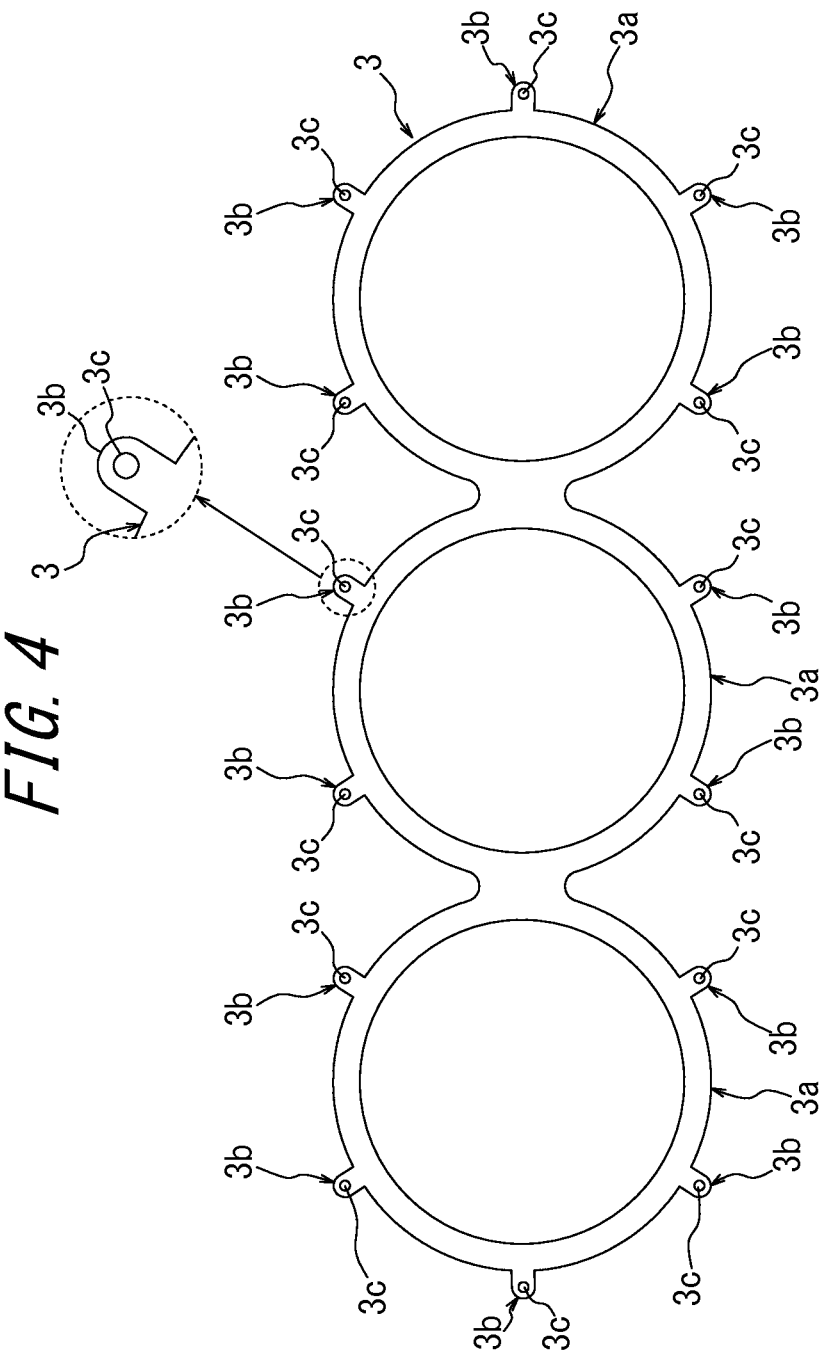
FIG. 4 is a plan view of a step adjustment plate of the metal gasket for a cylinder head according to the above embodiment.
Figure 5:
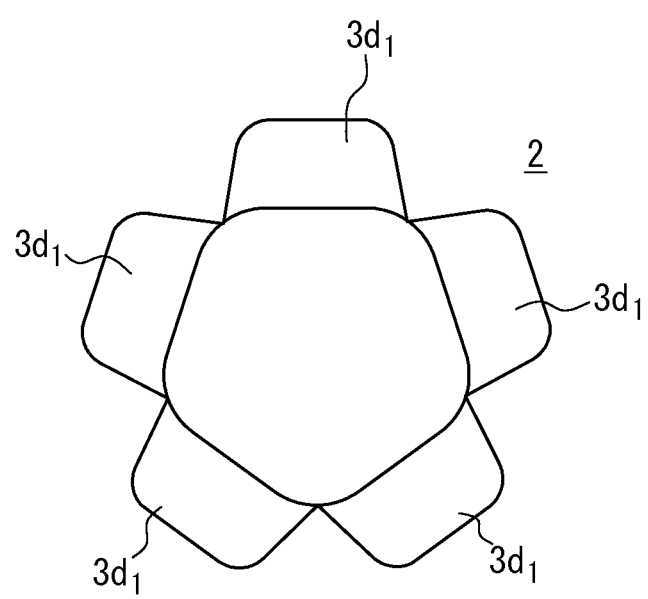
FIG. 5 is a plan view of a protruding piece of the step adjustment plate in the metal gasket for a cylinder head according to the above embodiment, wherein the protruding piece is in a state in which a tubular portion is inserted through a fastening hole of the lower substrate and folded over to an outside of the lower substrate.

Moreover, as shown in FIG. 4, the metal gasket 1 of the present embodiment includes a step adjustment plate 3 interposed between the two substrates 2. The step adjustment plate 3 is a metal layer that is thinner than the substrates 2 (e.g., from 0.01 mm to 0.15 mm in thickness) and is made of stainless steel (preferably, a resilient material such as stainless steel used for making springs). The step adjustment plate 3 includes: three annular portions 3a each disposed, with respect to each substrate 2, over and around the periphery of a different one of the cylinder holes 2a; and protruding pieces 3b formed integrally with each of the annular portions 3a at a peripheral edge thereof. The three annular portions 3a are connected with one another. The protruding pieces 3b protrude outward from the peripheral edge of each annular portion 3a and extend at least to a position of the cooling water jacket or positions of the coolant holes of the cylinder block. In this example, four or five protruding pieces 3b are provided in each annular portion 3a in correspondence with the four or five fastening holes 2h formed around each cylinder hole 2a in the lower substrate 2. As shown in FIG. 5, each protruding piece 3b is firmly hooked through the lower substrate 2 at five projecting segments $3d_1$ (crimped segments) flattened in a petaloid shape. The projecting segments $3d_1$ are described later.

Note that, as FIG. 2B shows a relation between the step adjustment plate 3 and the annular beads 2b in a widthwise direction thereof, the outer edge surface of each annular portion 3a of the step adjustment plate 3 located closer to the coolant holes is situated outward from an outer edge L2, thereby forming a bead profile of the annular beads 2b in FIG. 2B. In other words, the step adjustment plate 3 is disposed to cover the entire annular bead in the widthwise direction.

Figure 6:
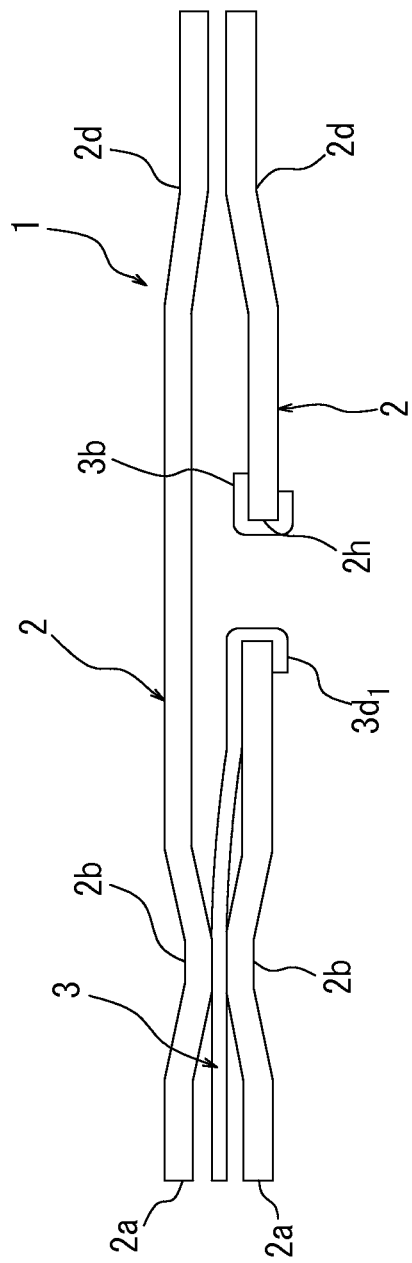
FIG. 6 is a cross-section view of a metal gasket for a cylinder head according to another embodiment in accordance with the present invention, wherein the metal gasket is viewed from substantially the same position as in FIG. 2A.

FIG. 6 is a cross-section view of the metal gasket 1 of another embodiment according to the present invention, wherein the metal gasket 1 is viewed from substantially the same position as in FIG. 2A. The FIG. 6 embodiment differs from the above embodiment only in that the projecting direction of the annular beads 2b and the outer bead 2d are modified so that the beads 2b and 2d face each other. Apart from this point, the FIG. 6 embodiment has substantially the same structure as the above embodiment.

According to the metal gasket 1 of the above two embodiments, owing to the plurality of projecting segments $3d_1$ folded over across corresponding fastening holes 2h and flattened out, firm engagement is established between the substrate 2 and the step adjustment plate 3. As a result, even when fretting (relative surface motion in the direction parallel to the deck surfaces) occurs in the deck surfaces in the presence of repeated heating and cooling of the cylinder head and the cylinder block, disengagement of the step adjustment plate from the substrate is prevented.

Furthermore, according to the metal gasket 1 of the above two embodiments, as shown in FIG. 2A, since an entire bead area ranging from an inner edge L1 to the outer edge L2 of the annular bead 2b rests on the step adjustment plate 3, step differences are provided between the annular beads 2b and the outer beads 2d in the substrates 2. As a result, surface pressure to the annular beads 2b and the outer beads 2d is improved, and therefore, the entire annular beads 2d are allowed to be compressed. In particular, even when the extremely thin metal foil having the thickness of 0.05 mm is used, the surface pressure balance is appropriately adjusted by the slight step.

Moreover, according to the metal gasket 1 of the above two embodiments, since the fastening holes 2h for insertion of the tubular portions 3d are formed along the peripheries of the annular beads in correspondence with the coolant holes of the cylinder head, as well as the cooling water jacket or the coolant holes of the cylinder block, a portion of each tubular portion that is folded over to the outside and flattened out can enter a corresponding coolant hole or a corresponding cooling water jacket without being sandwiched between the deck surfaces of the cylinder head and cylinder block. Consequently, the folded and flattened portions can withstand increases in surface pressure in the annular beads 2b.

Moreover, according to the metal gasket 1 of the above two embodiments, the number of the projecting segments $3d_1$ formed in each protruding piece 3b is five. Thus, when flattened into petaloid shapes each having a plurality of petals, the projecting segments $3d_1$ of the tubular portion 3d have sufficient size to establish firm engagement with the substrate 2.

Moreover, according to the metal gasket 1 of the above two embodiments, the number of fastening holes 2h formed in the substrate 2 for engaging the protruding pieces 3b is four or five in correspondence with each cylinder bore. Thus, the force with which the step adjustment plate 3 engages the substrate 2 is sufficiently enhanced so that disengagement of the step adjustment plate 3 from the substrate 2 is prevented even when fretting occurs in the deck surfaces of the cylinder head and the cylinder block.

Next, a description is given of a method for manufacturing the metal gasket 1 according to the above embodiments.

Figure 7:
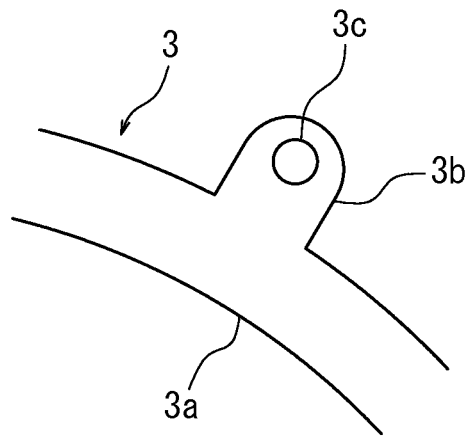
FIG. 7 is a plan view of the protruding piece of the step adjustment plate in the metal gasket for a cylinder head, according to the other embodiment, before bending the tubular portion upward.
Figure 8A:
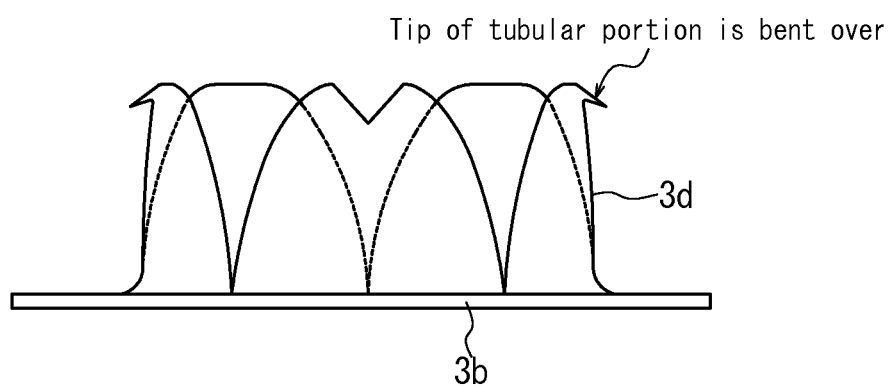
FIG. 8A is a side view of the tubular portion formed by directly piercing a pentagonal pyramidal punch without first forming the prepared hole.
Figure 8B:
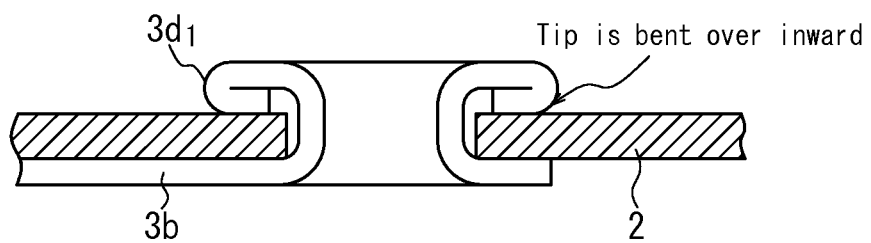
FIG. 8B is a cross-section view of the tubular portion of FIG. 8A, in which the tubular portion has been inserted through the fastening hole of the substrate and flattened out.
Figure 9:
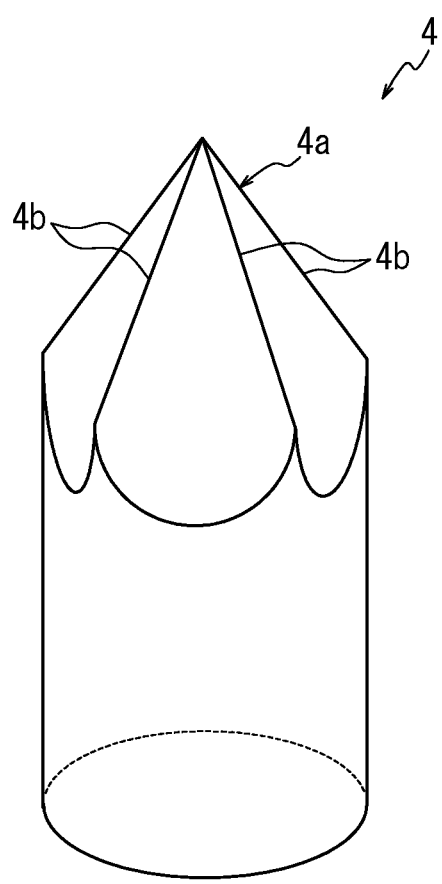
FIG. 9 is a perspective view of a die including the pentagonal pyramidal punch applicable in the present invention.

To begin with, as shown in an enlarged manner in FIG. 7, a prepared hole 3c is formed at an upper end portion of each protruding piece 3b of the step adjustment plate 3. The reason why the prepared hole 3c is formed in the protruding piece 3b is that, if the pentagonal pyramidal punch directly pierces into the protruding piece 3b to form the tubular shape, and if the formed tubular portion 3d is inserted through the fastening hole 2h of the substrate 2 for folding and flattening, the tip of the tubular portion 3d might become bent over. This poses a risk of the step adjustment plate 3 possibly not being completely integrated with the substrate 2, due to the tip of the tubular portion 3d being turned outward after the tubular portion 3b is bent upward (refer to FIG. 8A). During the immediately subsequent flattening process, the outwardly-turned portion is bent over inward (refer to FIG. 8B).

Figure 10A:
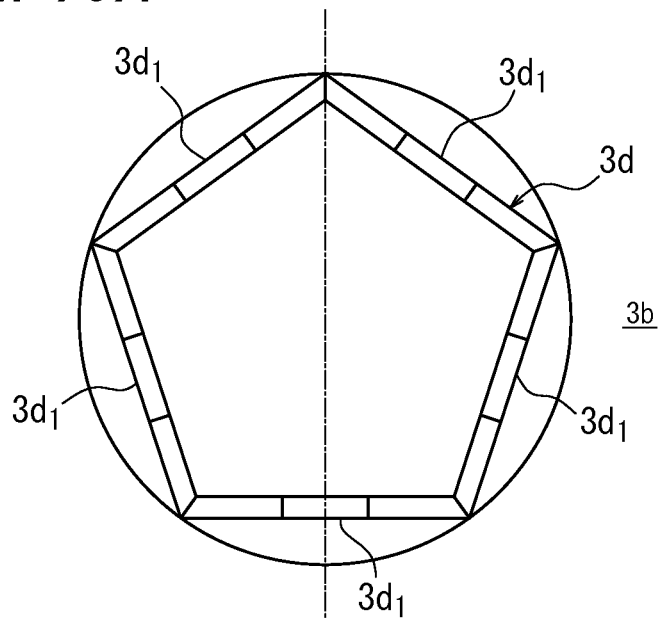
FIG. 10A is a plan view of the tubular portion formed by the method for manufacturing a metal gasket for a cylinder head in accordance with the present invention.
Figure 10B:
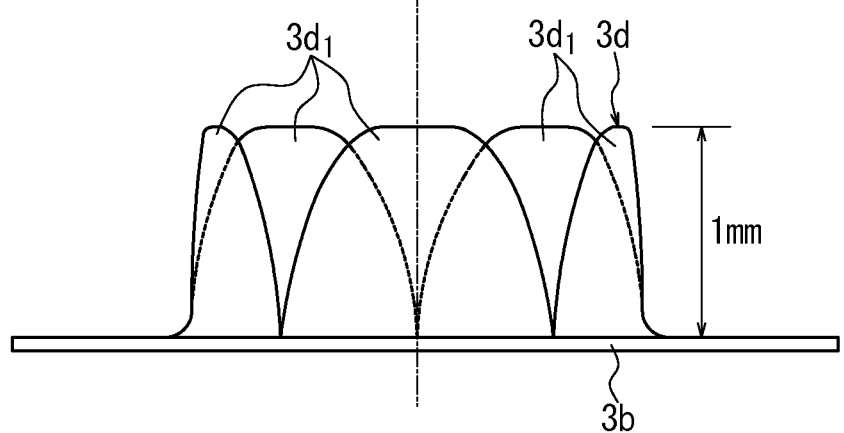
FIG. 10B is a side view of the same.

Subsequently, a drawing process is applied to the peripheral portion around the prepared hole 3c formed in each protruding piece 3b by inserting a die 4 including a polygonal pyramidal (pentagonal pyramidal in this example) punch 4a. By doing so, as shown in FIGS. 10A and 10B, the peripheral portion is bent up into the tubular shape while the segments are being cut by the blades (angled edges) 4b of the punch 4a. Thus, the tubular portions 3d composed of multiple projecting segments $3d_1$ are formed. As for a height of the tubular portion 3d, as shown in FIG. 10B, a height of 1 mm is sufficient enough, for example. Meanwhile, a portion of the die 4 below the punch 4a is made cylindrical.

Figure 11:
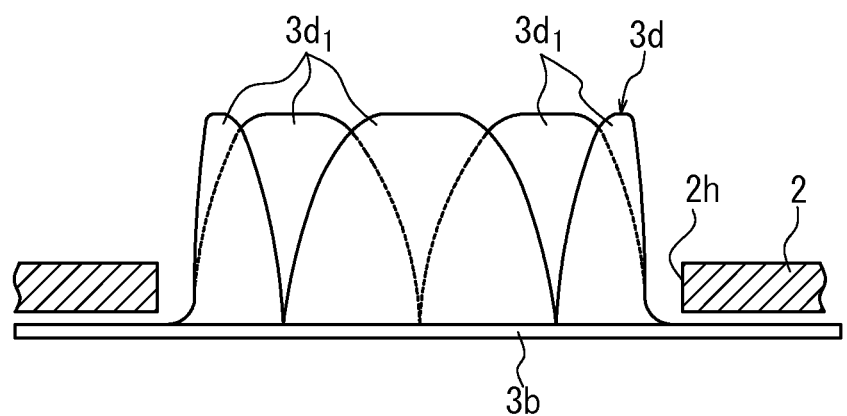
FIG. 11 is a side view of the tubular portion formed by the method for manufacturing a metal gasket for a cylinder head in accordance with the present invention, in which the tubular portion has been inserted through the fastening hole of the substrate.

Subsequently, the step adjustment plate 3, in which the tubular portion 3d has been bent up in each protruding piece 3b as described above, is disposed on the lower substrate 2 shown in FIG. 3. At this time, the three annular portions of the step adjustment plate 3 and the peripheries of the three cylinder holes 2a are aligned one above another. As shown in FIG. 11, the tubular portion 3d of each protruding piece 3b is inserted through a corresponding fastening hole 2h formed in the substrate 2. Note that the circular fastening holes 2h (preferably having a circular shape) can be formed in the bottom substrate 2 at any time in advance.

Figure 12:
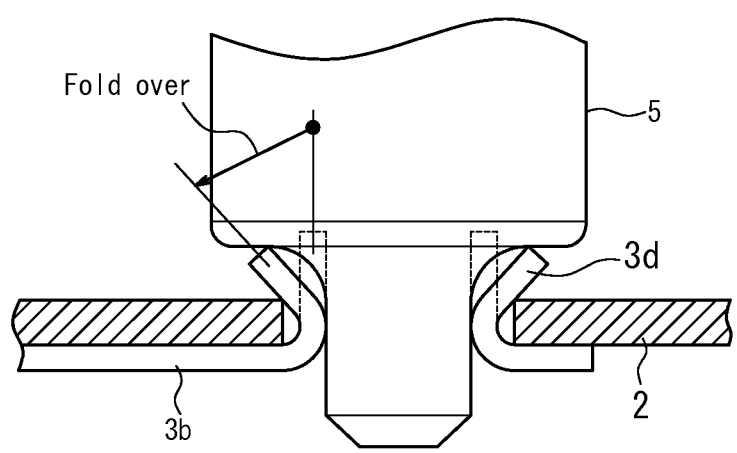
FIG. 12 is a side view of the tubular portion formed by the method for manufacturing a metal gasket for a cylinder head in accordance with the present invention, wherein the tubular portion is folded over to the outside using a folding die.
Figure 13:
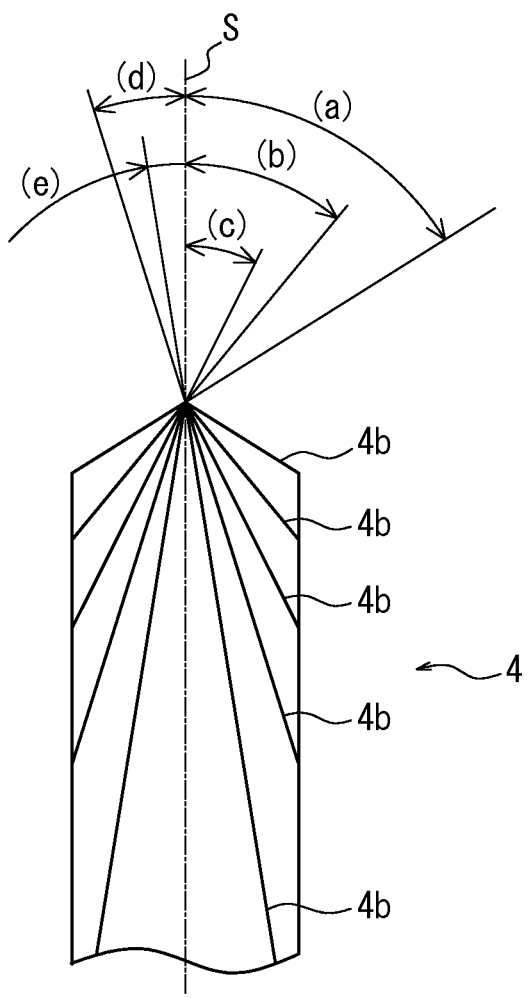
FIG. 13 illustrates the die including polygonal pyramidal punches applicable in the method for manufacturing a metal gasket for a cylinder head in accordance with the present invention, together with a correspondence table regarding cone angles of the punches.

Subsequently, as shown in FIG. 12, the projecting segments $3d_1$ of the tubular portion 3d of each protruding piece 3b, inserted through the corresponding fastening hole 2h, are folded over to the outside using a die 5 including a punch having a conically-shaped tip, for example. In this circumstance, since the tubular portion 3d has been cut into the plurality (five in this case) of projecting segments $3d_1$ having a substantially uniform size, the tubular portion 3d is uniformly bent into a petaloid shape, having a plurality of petals, when folded over to the outside.

Then, the petaloid-shaped projecting segments $3d_1$ of the tubular portion 3d are flattened out using a die (not shown) that includes a punch having a flat tip, for example. As a result, as shown in FIG. 5, the tubular portion 3d is flattened in the petaloid shape with the plurality of petals being of substantially uniform size. Each projecting segment $3d_1$ has a size sufficient for being hooked against the substrate 2.

Figure 24:
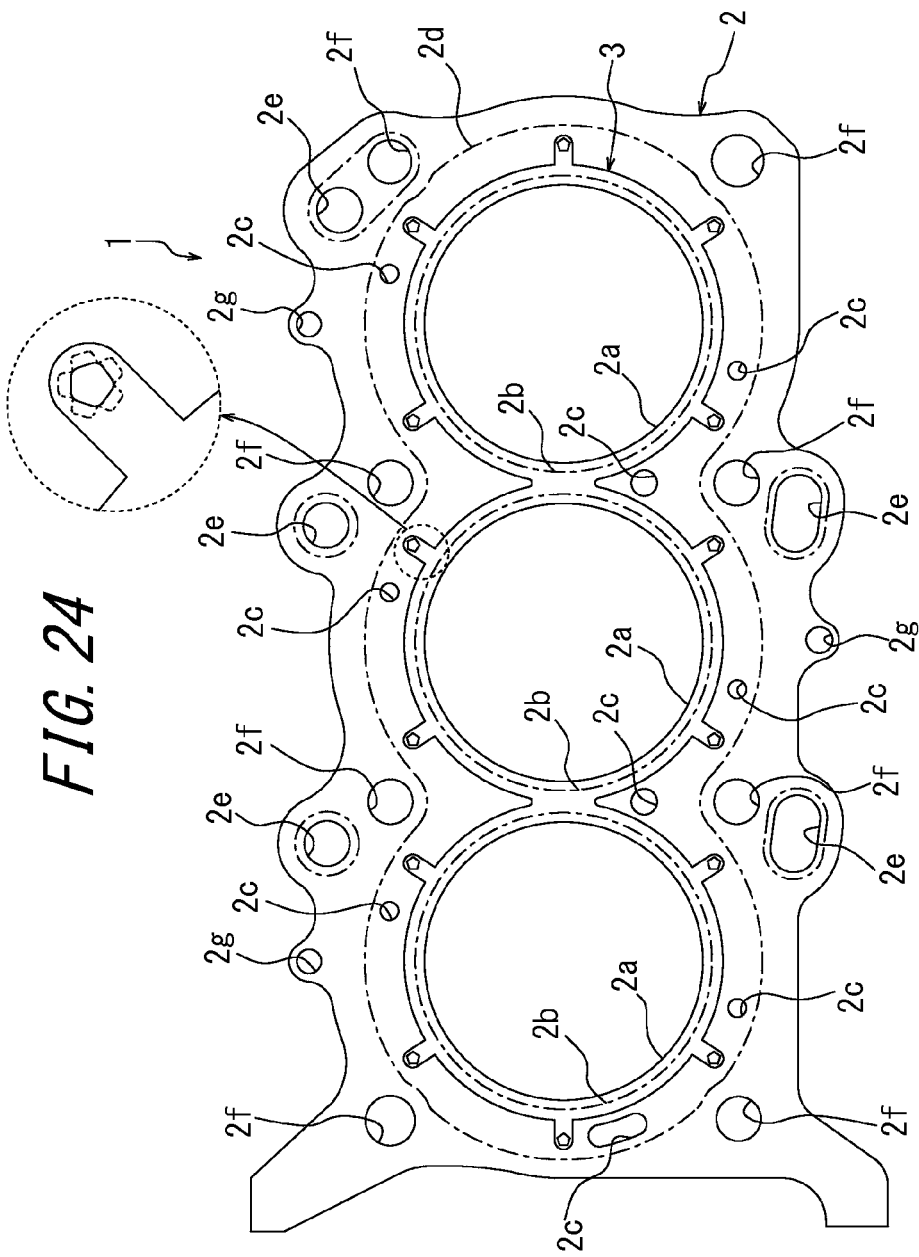
FIG. 24 is a plan view of the metal gasket for a cylinder head of the above embodiment according to the present invention with the step adjustment plate mounted on the lower substrate.

In this way, the step adjustment plate 3 engages with the lower substrate 2 via the tubular portions 3d of the protruding pieces 3b. Then, as shown in FIG. 2A, an upper substrate 2 is placed over the step adjustment plate 3 and processed as shown in FIG. 24. Subsequently, the three cylinder holes 2a of each of the lower and the upper substrate 2 are aligned one above another. Furthermore, although not shown, typical grommets are inserted into the eyelet holes 2g of each of the lower and the upper substrate 2 aligned one above another. The grommets are compressed so that the two substrates 2 and the step adjustment plate 3 interposed therebetween are maintained in a fixed position. It should be noted that the eyelet holes 2g are provided outward from an area of the cylinder block and the cylinder head of the engine. Therefore, the grommets are prevented from decreasing the surface pressure of the beads 2b and 2d by being sandwiched between the deck surfaces of the cylinder block and the cylinder head of the engine.

According to the method for manufacturing the metal gasket 1, since the die 4 including the polygonal pyramidal punch 4a is used for bending up the peripheral portion around each prepared hole 3c formed in the protruding piece 3b of the step adjustment plate 3 into the tubular shape, the sidewall of the bent-up tubular portion 3d is cut into plural projecting segments $3d_1$ having substantially uniform size by the blades 4d (i.e., angled edges joining adjacent conical surfaces) of the punch 4a. By folding the plurality of projecting segments $3d_1$ to the outside and flattening out the projecting segments $3d_1$, the projecting segments $3d_1$ are flattened in the desired petaloid shape in a uniform manner, thereby establishing firm engagement between the substrate 2 and the step adjustment plate 3. As a result, even if fretting (relative surface motion in directions parallel to the deck surfaces) occurs in the deck surfaces of the engine due to repeated heating and cooling of the cylinder head and the cylinder block, disengagement of the step adjustment plate 3 from the substrate 2 is prevented. The present manufacturing method is particularly advantageous when a resilient material (e.g., stainless steel as used for making springs) is used for making the step adjustment plate 3.

In the method for manufacturing the metal gasket 1, it is preferable that the polygonal pyramidal punch 4a of the die 4 comprise a pentagonal pyramidal punch, and the plurality of projecting segments $3d_1$ of the tubular portion 3d comprise five projecting segments. With such a punch structure, the projecting segments $3d_1$ of the tubular portion 3d (which have been flattened into the petal shape) are each assured to have a sufficient size for achieving firm engagement with the substrate 2.

Furthermore, in the above method for manufacturing a metal gasket 1, it is preferable that the punch 4a of the die 4 have a cone angle θ ranging from 20 to 40 degrees. Note that the "cone angle θ of the punch" herein refers to an angle formed by the angled edges, which are located in boundaries between adjacent conical surfaces of the polygonal pyramidal punch and that serve as blades, with respect to an axis S of the punch. If the cone angle θ of the punch is greater than 40 degrees, some parts of the tubular portion 3d cannot be cut into a plurality of segments simultaneously with formation thereof, and discrepancy might occur in number and angle (i.e., an inclination angle of the projecting segments $3d_1$ with respect to a plane in which the step adjustment plate 3 extends). On the other hand, if the cone angle θ of the punch is less than 20 degrees, the press stroke of the punch is lengthened, and the tip of the die is thinned, which cause the die to have an increased risk of break-off at the tip during the use, although this case presents no problems in terms of forming the tubular portion 3d.

Figure 14:
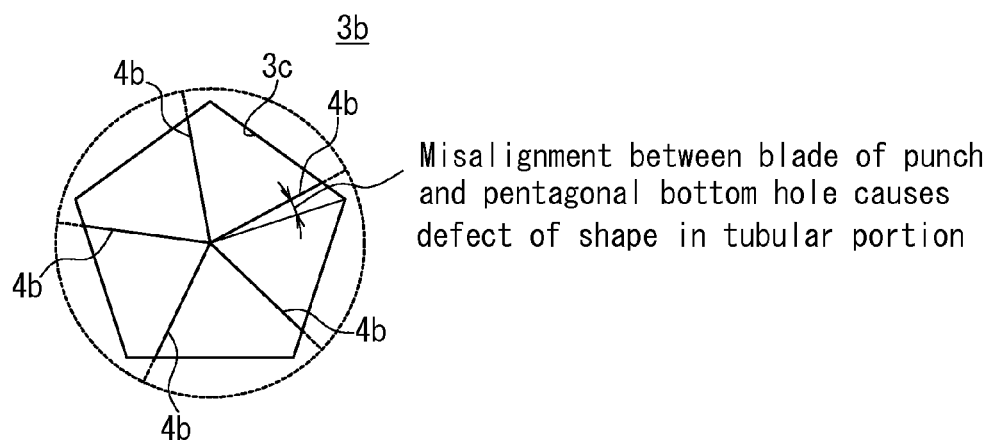
FIG. 14 is a plan view of a state in which the die including the pentagonal pyramidal punch is inserted into a pentagonal prepared hole formed in the protruding piece of the step adjustment plate.

Moreover, in the above method for manufacturing the metal gasket, it is preferable that the shape of the prepared hole 3c formed in the step adjustment plate 3 be circular. Although it is no problem to form the prepared hole 3c in a polygonal shape in concordance with the shape of the punch, as shown in FIG. 14, such a polygonal prepared hole in combination with the similarly polygonal pyramidal punch adversely affects workability, particularly in terms of achieving positional precision and angular positional precision of the hole 3c and the punch. On the other hand, whenever the prepared hole 3c is formed in a circular shape, the need for positional alignment and angular positional alignment is eliminated, thereby achieving favorable quality and improved workability.

Moreover, in the above method for manufacturing the metal gasket, it is preferable that the fastening hole 2h formed in the substrate 2 be circular. Although it is no problem to form the fastening hole 2h in a polygonal shape in concordance with the cross section shape of the tubular portion 3d, such a polygonal fastening hole 2h, in combination with the similarly polygonal tubular portion 3d to be inserted into the fastening hole 2h, adversely affects workability, particularly in terms of achieving precision of position and angle of the fastening hole 2h and the tubular portion 3d. Furthermore, whenever the fastening hole 2h in the substrate 2 has a polygonal shape, the folding die used for folding the projecting segments $3d_1$ of the tubular portion 3d over to the outside and flattening out the projecting segments $3d_1$ should also be polygonal. Otherwise, workability is adversely affected in terms of securing positional precision and angular precision of the folding die and the projecting segments $3d_1$. On the other hand, whenever the fastening hole 2h is circular, the need for positional alignment and angular alignment is eliminated both between the fastening hole 2h and the tubular portion 3d and between the folding die and the projecting segments $3d_1$. Consequently, favorable quality is maintained while workability is improved.

EXAMPLES

Figure 15:
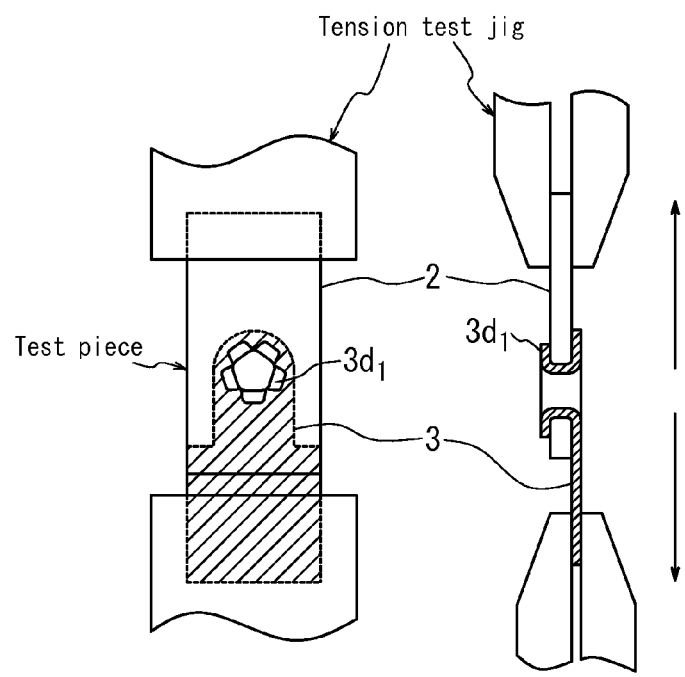
FIG. 15 illustrates a tensile test carried out by taking out a portion of the metal gasket manufactured by the method for manufacturing a metal gasket for a cylinder head in accordance with the present invention around where the substrate and the step adjustment plate are engaged with each other.

As shown in FIG. 15, in order to confirm the effects achieved by the method for manufacturing a metal gasket for a cylinder head according to the present invention, portions (test pieces) were prepared. To fabricate the test pieces, the substrate 2 and step adjustment plate 3 were coupled to each other by application of the method for manufacturing a metal gasket for a cylinder head according to a first example of the present invention (referred to below as the "manufacturing method of Example 1"), the method for manufacturing a metal gasket for a cylinder head according to a second example of the present invention (referred to below as the "manufacturing method of Example 2"), or the method for manufacturing a metal gasket for a cylinder head according to a third example of the present invention (referred to below as the "manufacturing method of Example 3"). Coupling strength of the substrate 2 to the step adjustment plate 3 was evaluated for each test piece using a tensile test apparatus.

The manufacturing method of Example 1 comprised, for engaging the step adjustment plate 3 with the substrate 2, the steps of: forming a pentagonal prepared hole 3c in each protruding piece 3b of the step adjustment plate 3; forming tubular portions 3d each including five projecting segments $3d_1$ by inserting a die 4 (including the pentagonal pyramidal punch 4a) into the prepared hole 3c; forming in the substrate 2 a pentagonal fastening hole 2h in correspondence with the position of the tubular portion 3d formed in the step adjustment plate 3; and inserting the tubular portion 3d of the step adjustment plate 3 through the corresponding fastening hole 2h formed in the substrate 2. Afterward, the projecting segments $3d_1$ of the tubular portion 3d were folded to the outside and the projecting segments $3d_1$ were flattened out using the pentagonal folding die.

The manufacturing method of Example 2 comprised, for engaging the step adjustment plate 3 with the substrate 2, the steps of: forming a circular prepared hole 3c in each protruding piece 3b of the step adjustment plate 3; forming tubular portions 3d, each including five projecting segments $3d_1$, by inserting a die 4 (including the pentagonal pyramidal punch 4a), into the prepared hole 3c; forming in the substrate 2 a pentagonal fastening hole 2h in correspondence with the position of the tubular portion 3d formed in the step adjustment plate 3; and inserting the tubular portion 3d of the step adjustment plate 3 through the corresponding fastening hole 2h formed in the substrate 2. Afterward, the projecting segments $3d_1$ of the tubular portion 3d were folded to the outside and the projecting segments $3d_1$ were flattened out using the pentagonal folding die.

The manufacturing method of Example 3 comprised, for engaging the step adjustment plate 3 with the substrate 2, the steps of: forming a circular prepared hole 3c in each protruding piece 3b of the step adjustment plate 3; forming tubular portions 3d, each including five projecting segments $3d_1$, by inserting a die 4 including the pentagonal pyramidal punch 4a into the prepared hole 3c; forming in the substrate 2 a circular fastening hole 2h in correspondence with the position of the tubular portion 3d formed in the step adjustment plate 3; and inserting the tubular portion 3d of the step adjustment plate 3 through the corresponding fastening hole 2h formed in the substrate 2. Afterward, the projecting segments $3d_1$ of the tubular portion 3d were folded to the outside, and the projecting segments $3d_1$ were flattened out using the pentagonal folding die.

In each Example, the portions around which the substrate and the step adjustment plate are engaged with each other were collected with respect to the respective gaskets manufactured according to the aforementioned three types of manufacturing methods. Tensile tests were carried out as shown in FIG. 15. In each Example, the gasket did not break until the test force reached 200N, which represented a sufficient coupling strength. The differences in the manufacturing methods did not yield any difference in terms of coupling strength. Whenever the tubular portion 3d was formed in the protruding piece 3b of the step adjustment plate 3 using the punch 4a, no undesired cracks or loss of the projecting segments $3d_1$ were seen in the tubular portions 3d, except for cracks and loss of projecting segments seen in the cut portions between adjacent projecting segments $3d_1$.

The test results revealed that the metal gasket 1 capable of improving the engaging force between the substrate 2 and the step adjustment plate 3 was manufacturable at low cost and in a stable manner so long as the manufacturing method of Example 3 was used, i.e., whenever the tubular portion 3d was formed from the peripheral portion around the prepared hole 3c using the die 4 including the pentagonal pyramidal punch 4a. Hence, there was no need to adopt the manufacturing methods of Examples 1 and 2, which are inferior in terms of workability because of the importance in Examples 1 and 2 of the precision of position and angle of the holes.

Figures 16A, 16B:
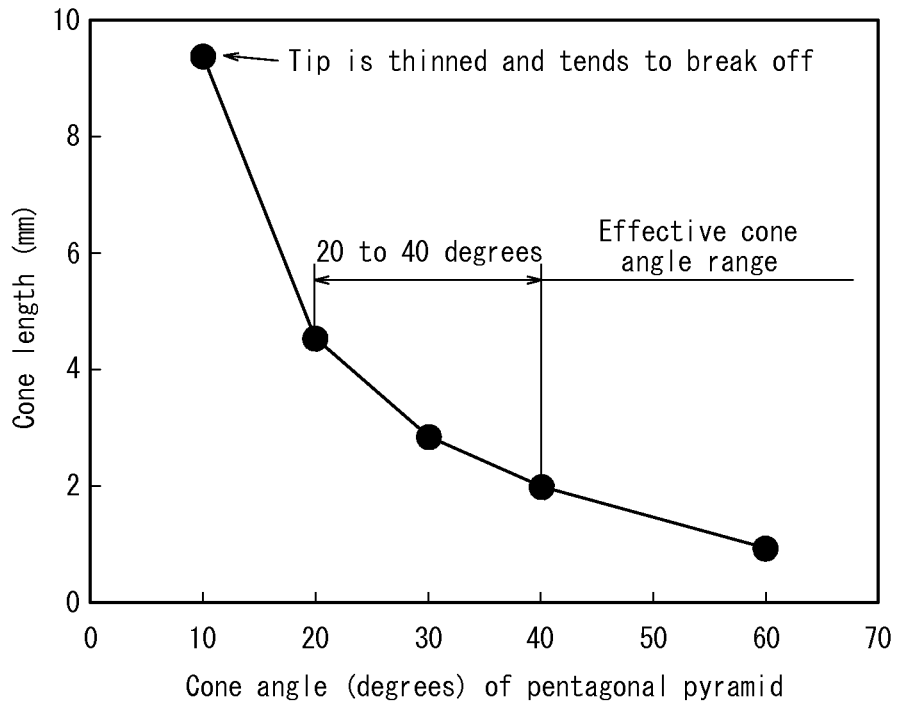
FIG. 16A is a table showing results of manufacturing verification conducted by varying the blade angle of the punch.
FIG. 16B is a graph showing a relation between the cone angle and cone length.

Next, a description is given of work tests conducted on tubular portions 3d, The tests were carried out by varying the cone angle θ (blade angle) of the pentagonal pyramidal punch. In the work tests, five dies 4 were used, having cone angles θ of the punches 4a of 10 degrees, 20 degrees, 30 degrees, 40 degrees, and 60 degrees, respectively. FIG. 16A shows results of the tests. As can be seen from the test results, in the case of a die 4 in which the cone angle θ of the punch 4a is 60 degrees, a discrepancy sometimes occurred in number and angle of the cut projecting segments $3d_1$. This result was regarded as unstable. On the other hand, as shown in FIG. 16B, in the case of a die 4 in which the cone angle θ of the punch 4a is 10 degrees, press stroke is lengthened, and the tip of the die is thinned. These dies had an increased risk of break-off of the tip during use but exhibited no problems with forming the tubular portion 3d. From the above, it is understood that the cone angle θ of the punch 4a is preferably in the range of approximately 20 to 40 degrees.

Figure 17:
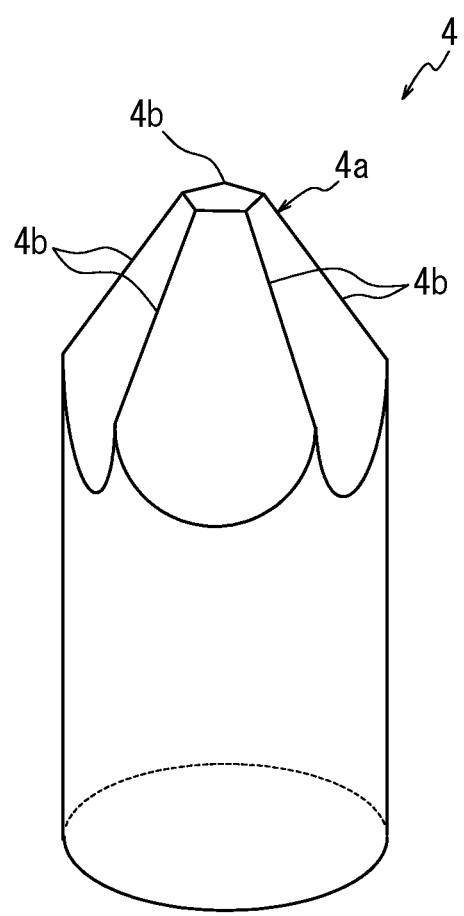
FIG. 17 is a perspective view of the die including another pentagonal pyramidal punch applicable in the method for manufacturing a metal gasket for a cylinder head in accordance with the present invention.
Figure 18:
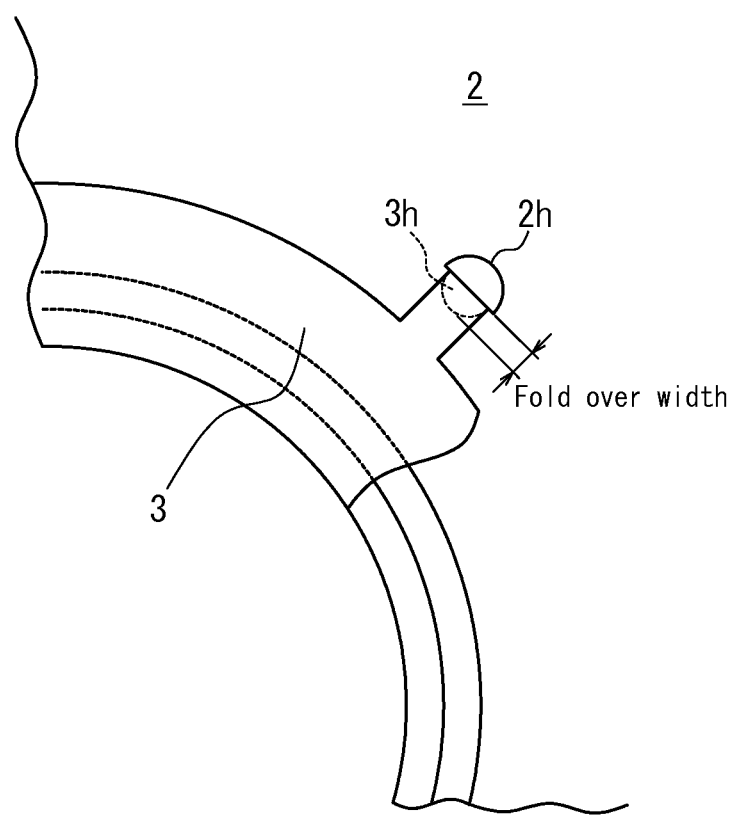
FIG. 18 is a partially enlarged plan view of a metal gasket according to a conventional technology.
Figure 19:
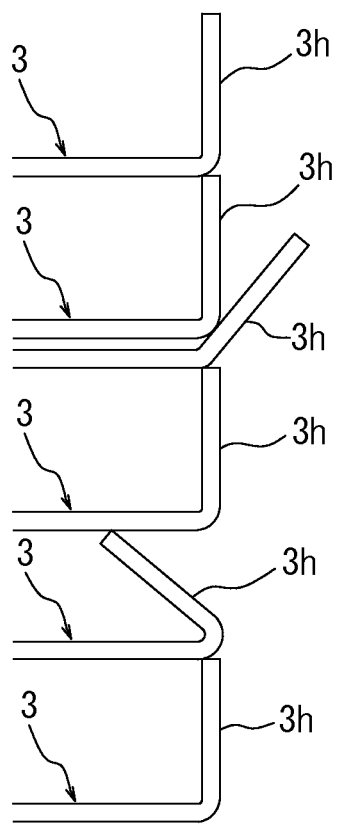
FIG. 19 is a cross-section view of step adjustment plates for metal gaskets according to the conventional technology with the step adjustment plates stacked on top of one another.
Figure 20A:
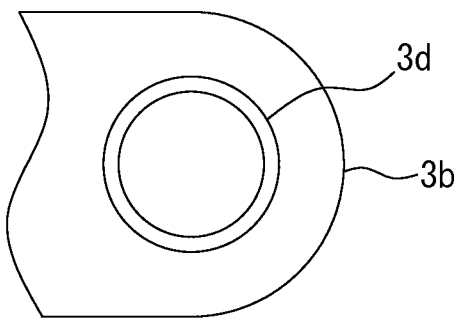
FIG. 20 is a cross-section view of a step adjustment plate of a metal gasket according to a Comparative Example in which the tubular portion having a circular cross section has been formed by drawing a peripheral portion around the prepared hole formed in the protruding piece of the step adjustment plate using the die including a cylindrical punch.
Figure 20B:
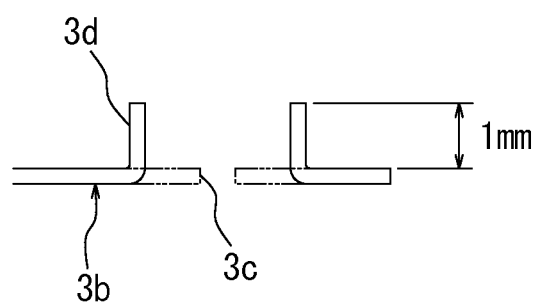
Figure 21:
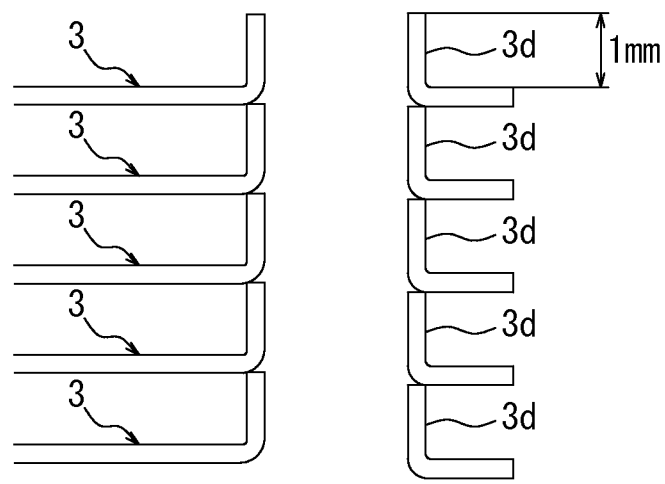
FIG. 21 is a cross-section view of step adjustment plates for metal gaskets according to a Comparative Example, wherein the step adjustment plates are stacked on top of one another.
Figures 22A, 22B:
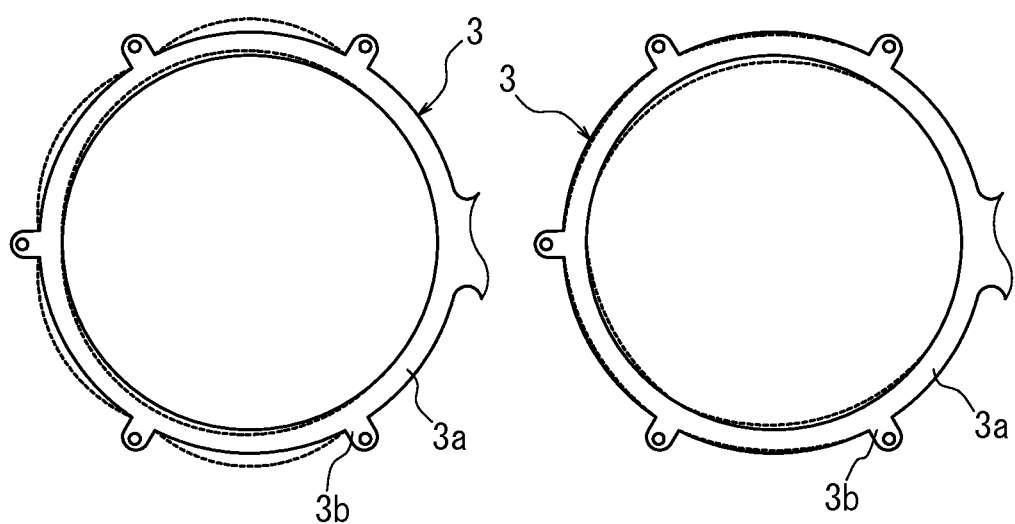
FIG. 22A and FIG. 22B illustrate a state in which the step adjustment plate is deformed whenever a material for deep drawing is used to fabricate the step adjustment plate.
Figure 23A:
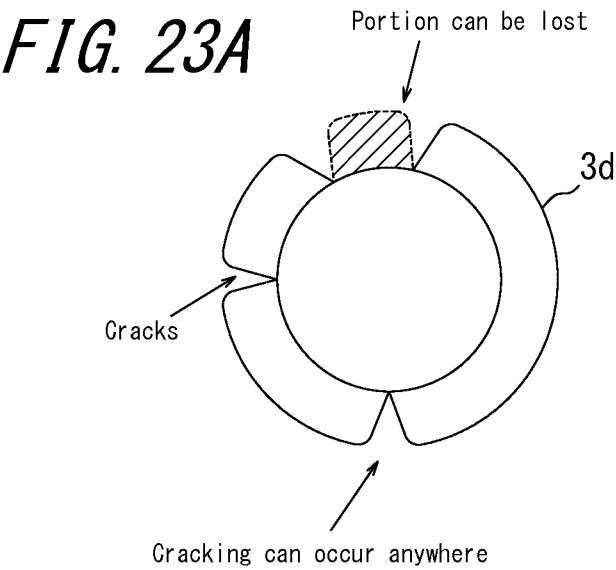
FIG. 23A is a plan view of the protruding piece of the step adjustment plate for the metal gasket according to a Comparative Example, in which the tubular portion having the circular cross section has been folded over to the outside and flattened out.
Figure 23B:
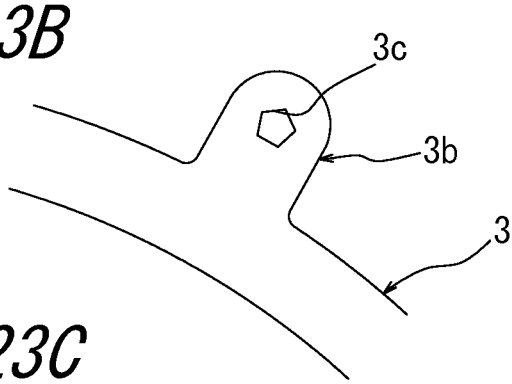
FIG. 23B is a plan view of the protruding piece of the step adjustment plate with the pentagonal prepared hole formed thereon.
Figure 23C:
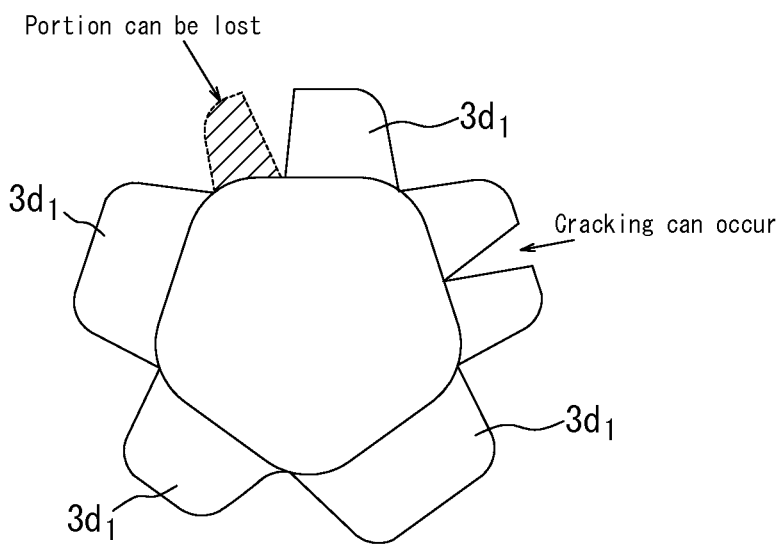
FIG. 23C is a plan view showing a state in which the tubular portion has been folded over to the outside and flattened out. The tubular portion is formed by inserting the die including the cylindrical punch into the pentagonal prepared hole formed in the protruding piece of the step adjustment plate.

Although the present invention has been described based on the example embodiments shown in the drawings, the present invention is not limited to those embodiments. For example, the shape of the prepared hole 3c formed in each protruding piece 3b may be any other polygon, such as square or hexagonal. Furthermore, the fastening holes 2h may be formed in the upper substrate 2 for engagement of the tubular portions 3d of the step adjustment plate 3. Moreover, as shown in FIG. 17, the die 4 to be inserted into the prepared hole 3c formed in the protruding piece 3b for formation of the tubular portion 3d having the polygonal cross-section may include a punch 4a having the truncated polygonal pyramidal shape in which the tip of the punch 4a is flattened or rounded.

INDUSTRIAL APPLICABILITY

Thus, according to the present invention, the method for manufacturing a metal gasket for a cylinder head that is capable of establishing the firm engaged state between the substrate and the step adjustment plate, as well as the metal gasket for a cylinder head that is capable of improving the engaging force between the substrate and the step adjustment plate made of the resilient metal foil having the thickness ranging from 0.05 mm to 0.15 mm, is provided.

REFERENCE SIGNS LIST 1 metal gasket for cylinder head
2 substrate
3 step adjustment plate
3a annular portion
3b protruding piece
3c prepared hole
3d tubular portion
$3d_1$ projecting segments
4 die
4a punch

The invention claimed is:
1. A method for manufacturing a metal gasket for a cylinder head, the metal gasket including:
at least one substrate made of a resilient metal layer and having cylinder holes formed in correspondence with cylinder bores in a cylinder block to be mounted with the cylinder head in an engine, annular beads each formed around a different one of the cylinder holes, coolant holes formed around an outer periphery of each of the annular beads in correspondence with coolant holes of the cylinder head and a cooling water jacket or coolant holes of the cylinder block, and an outer bead formed and positioned to entirely enclose the annular beads and the coolant holes; and a step adjustment plate made of a metal layer and having a plurality of annular portions each disposed over and around an outer periphery of a different one of the cylinder holes of the substrate; and a plurality of protruding pieces formed integrally with each annular portion at a peripheral edge thereof, each protruding piece of the step adjustment plate engaged through the substrate, the method comprising the steps of:

forming a prepared hole in each protruding piece of the step adjustment plate;

forming a tubular portion including a plurality of projecting segments by inserting a die including a polygonal pyramidal punch into the prepared hole so as to bend up a peripheral portion around the prepared hole while cutting the peripheral portion into segments;

forming in the substrate a fastening hole in correspondence with a position of the tubular portion formed in the step adjustment plate; and directly engaging the protruding piece through the substrate by inserting the tubular portion of the step adjustment plate through the corresponding fastening hole formed in the substrate, and subsequently folding the plurality of projecting segments of the tubular portion over to an outside of the substrate and flattening out the projecting segments.

2. The method according to claim 1, wherein the polygonal pyramidal punch of the die comprises a pentagonal pyramidal punch, and the plurality of projecting segments of the tubular portion comprises five projecting segments.

3. The method according to claim 1, wherein the punch of the die has a cone angle ($\theta$) ranging from 20 to 40 degrees.

4. The method according to claim 1, wherein a shape of the prepared hole formed in the step adjustment plate is circular.

5. The method according to claim 1, wherein a shape of the fastening hole formed in the substrate is circular.

6. The method according to claim 1, wherein the substrate is a first substrate, the method further comprising:

disposing the step-adjustment plate between the first substrate and a second substrate, the second substrate defining cylinder holes, annular beads, coolant holes, and an outer bead that register with the cylinder holes, annular beads, coolant holes, and outer bead, respectively, of the first substrate; and coupling the second substrate to the step-adjustment plate in the same manner as the first substrate is coupled to the step-adjustment plate.

7. The method of claim 1, wherein:
the polygonal pyramidal punch is truncated; and
the tip of the punch is flattened or rounded.

8. The method of claim 1, wherein:
the polygonal pyramidal punch is a pentagonal pyramidal punch having a cone angle of 20 to 40 degrees; and
the plurality of projecting segments of the tubular portion comprises five projecting segments;
the prepared hole is circular; and
the fastening hole is circular.

9. A metal gasket for a cylinder head, the metal gasket including:

at least one substrate made of a resilient metal layer and having cylinder holes formed in correspondence with cylinder bores in a cylinder block to be mounted with the cylinder head in an engine, annular beads each formed around a different one of the cylinder holes, coolant holes formed around an outer periphery of each of the annular beads in correspondence with coolant holes of the cylinder head and a cooling water jacket or coolant holes of the cylinder block, and an outer bead formed and positioned to entirely enclose the annular beads and the coolant holes; and a step adjustment plate made of a metal layer and having a plurality of annular portions each disposed over and around an outer periphery of a different one of the cylinder holes of the substrate; and a plurality of protruding pieces formed integrally with each annular portion at a peripheral edge thereof, each protruding piece of the step adjustment plate engaged through the substrate, wherein a prepared hole is formed in each protruding piece of the step adjustment plate, and a tubular portion including a plurality of projecting segments is formed by inserting a die including a polygonal pyramidal punch into the prepared hole so as to bend up a peripheral portion around the prepared hole while cutting the peripheral portion into segments, and a fastening hole is formed in the substrate in correspondence with a position of the tubular portion formed in the step adjustment plate, and the protruding piece is directly engaged through the substrate by inserting the tubular portion of the step adjustment plate through the corresponding fastening hole formed in the substrate, and subsequently folding the plurality of segments of the tubular portion over to an outside of the substrate and flattening out the projecting segments.

10. The metal gasket according to claim 9, wherein an outer edge surface of each annular portion of the step adjustment plate located closer to the coolant holes is situated outward from an outer edge forming a bead profile of the annular beads and inward from an inner edge of the outer bead formed and positioned to entirely enclose the cooling water jacket or the coolant holes of the cylinder block and the coolant holes.

11. The metal gasket according to claim 9, wherein the substrate and step-adjustment plate are both made of a resilient metal.

12. The metal gasket according to claim 9, wherein the tubular portions are formed by inserting a die including a polygonal pyramidal punch into the respective prepared hole to bend upward a peripheral portion of the prepared hole while cutting the peripheral portion into segments.

13. The metal gasket according to claim 9, wherein the substrate is a first substrate, the gasket further comprising a second substrate, wherein the step-adjustment plate is disposed between the first and second substrates.

\* \* \* \* \*